United States Patent [19]

Okuzumi

[11] Patent Number: 5,095,773
[45] Date of Patent: Mar. 17, 1992

[54] JOINING STRUCTURE OF VEHICULAR POWER PLANT

[75] Inventor: Hiroshi Okuzumi, Zushi, Japan

[73] Assignee: Nissan Motor Company, Ltd., Yokohama, Japan

[21] Appl. No.: 734,037

[22] Filed: Jul. 23, 1991

Related U.S. Application Data

[63] Continuation-in-part of Ser. No. 477,085, Feb. 8, 1990, abandoned.

[30] Foreign Application Priority Data

Feb. 13, 1989 [JP] Japan ................. 1-15600[U]

[51] Int. Cl.$^5$ ............... F16H 57/02; F16L 23/032
[52] U.S. Cl. ................. 74/606 R; 180/312; 180/344; 285/328; 285/412; 403/337
[58] Field of Search ............. 180/292, 300, 312, 344, 180/346, 377, 382, 902; 74/606 R; 403/335, 336, 337, 364; 285/328, 368, 412

[56] References Cited

U.S. PATENT DOCUMENTS

| 139,877 | 6/1873 | Dame | 285/328 |
|---|---|---|---|
| 3,034,703 | 5/1962 | Fetter | 74/606 R X |
| 4,081,197 | 3/1978 | Ackel | 180/382 X |
| 4,160,472 | 7/1979 | Blackstone | 403/336 X |
| 4,253,776 | 3/1981 | Orain | 403/337 |
| 4,397,486 | 8/1983 | Ohya | 285/412 X |
| 4,467,754 | 8/1984 | Hayashi et al. | 74/606 R X |

FOREIGN PATENT DOCUMENTS 1812232 12/1969 Fed. Rep. of Germany.
3301709 8/1984 Fed. Rep. of Germany ...... 180/312

*Primary Examiner*—Andres Kashnikow
*Assistant Examiner*—Brian L. Johnson
*Attorney, Agent, or Firm*—Pennie & Edmonds

[57] ABSTRACT

A joining structure of an automotive vehicle power plant including a transmission and a torque converter. The housing of the transmission is integrally formed with a generally annular flange which is joined with a generally annular flange of the casing of the torque converter by fastening bolts so that the joining surfaces of the transmission housing and the torque converter casing are in tight contact with each other. Each fastening bolt is disposed through the bolt holes which are respectively formed in the flanges of the transmission housing and the torque converter casing. A plurality of depressions are formed at the joining surface of the transmission housing flange in such a manner that each bolt hole merges in the depression, so that projected and depressed parts are formed in the joining surface. The projected part is in contact with the joining surface of the torque converter casing flange. When the bolts are fastened, the fastening force is initially applied to the projected parts and thereafter gradually applied to the depressed parts, thereby being uniformly distributed over the whole joining surface of the transmission housing flange.

11 Claims, 7 Drawing Sheets

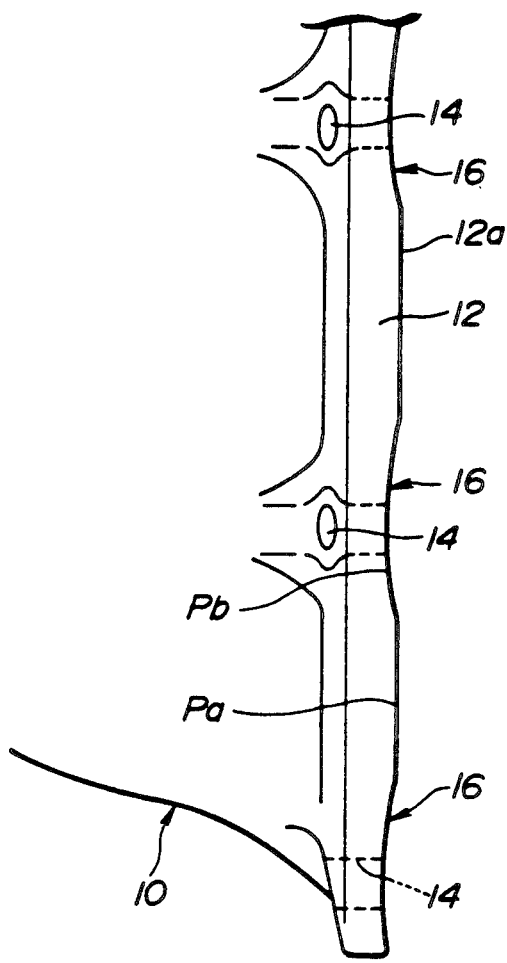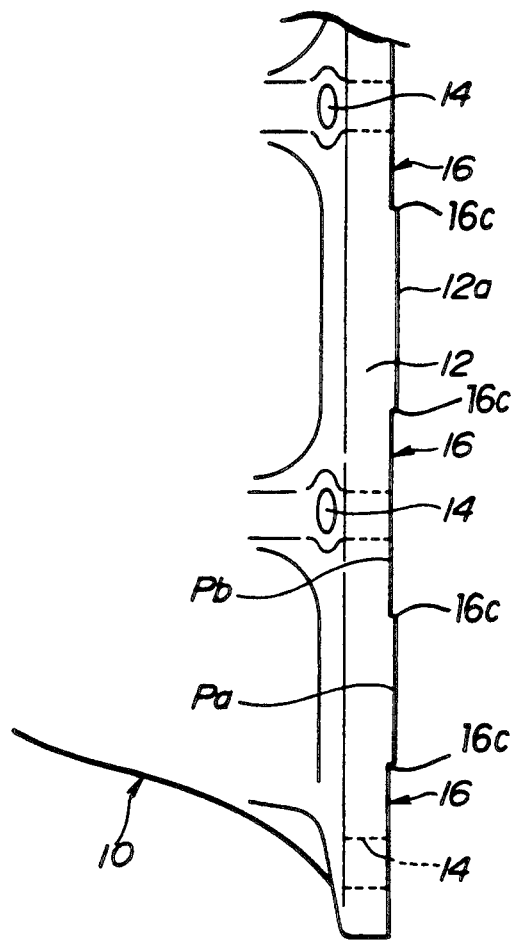

FIG. 6A *(PRIOR ART)*
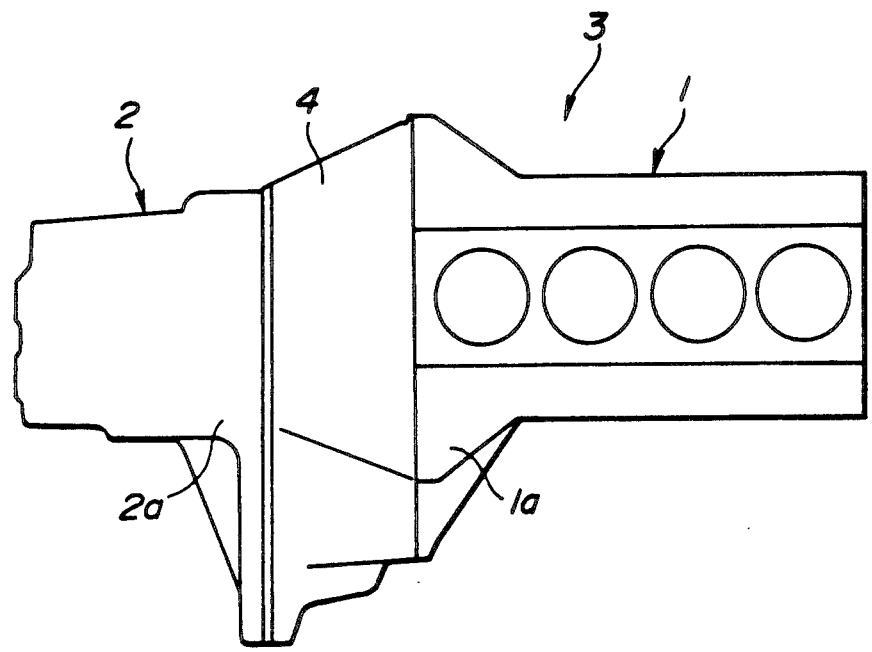
FIG. 6B *(PRIOR ART)*
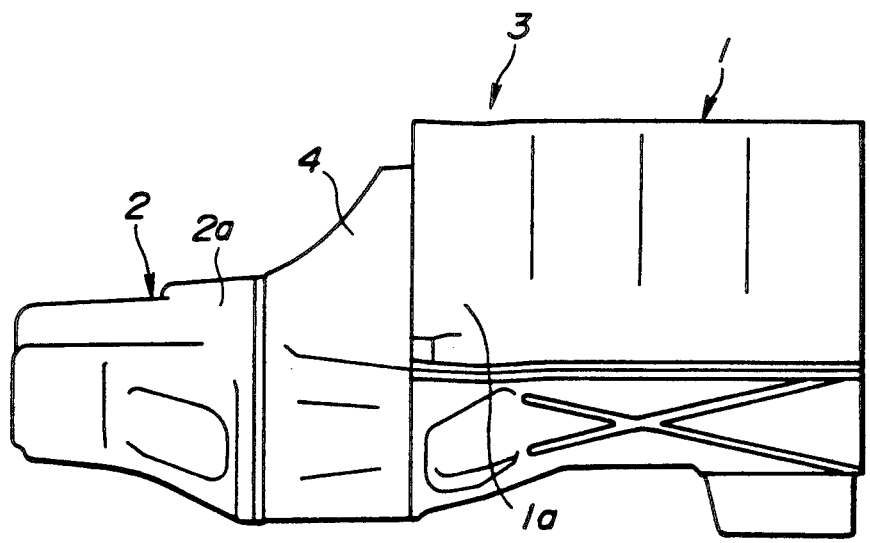

JOINING STRUCTURE OF VEHICULAR POWER PLANT

This is a continuation-in-part of application Ser. No. 07/477,085, filed Feb. 8, 1990, now abandoned.

BACKGROUND OF THE INVENTION

1. Field of the Invention

This invention relates to improvements in a vehicular power plant, and more particularly to a joining structure of the power plant to join a plurality of housing members accomodating mechanisms of the power plant.

2. Description of the Prior Art

In an automotive vehicle, power output from an engine is, in general, transmitted to road wheels through a transmission upon being suitably changed in rotational speed thus to drive the road wheels. As shown in FIGS. 6A and 6B of the drawings, an internal combustion engine 1 is incorporated through a clutch or a torque converter with a transmission 2, thereby constituting a power plant 3. More specifically, during assembly of the power plant 3 using the torque converter, a torque converter casing (housing member) 4 is joined with a cylinder block 1a while a transmission housing (housing member) 2a is joined with the torque converter casing 4. Such joining between the cylinder block 1a and the torque converter casing 4 and between the torque converter casing 4 and the transmission housing 2a is accomplished by means of bolts disposed along the periphery of each housing member.

However, with the above conventional power plant joining structure, when the bolts are fastened, stress is unavoidably concentrated only at locations to which fastening force of the bolts are applied, so that initial compressive stress due to bolt fastening force cannot be developed at other locations than the above fastening force applied location. As a result, the contacting joining surfaces of the opposite housing members are unavoidably locally separate from each other under deformation of the power plant 3 due to exciting force of engine combustion power and inertial force of reciprocally moving members. This reduces the total local rigidities of the joining surfaces which largely affects the deformation of the power plant 3. As a result, the joining rigidity between the joined housing members are lowered. Accordingly, there is a tendency of generating resonance vibration of the power plant 3 in a low frequency range under the effect of a joining rigidity between the cylinder block 1a and the transmission housing 2a which rigidity serves as a main spring. This unavoidably increases noise during acceleration and booming noise inside the vehicle passenger compartment.

SUMMARY OF THE INVENTION

It is an object of the present invention to provide an improved vehicular power plant joining structure by which the joining rigidity between housing members constituting the power plant is largely increased without increasing the thickness of the housing members.

Another object of the present invention is to provide an improved vehicular power plant joining structure in which the joining surfaces of housing members constituting the power plant are formed such that the fastening force of fastening bolts is distributed over the whole joining surfaces.

A vehicular power plant joining structure of the present invention is comprised of first and second housing members for accomodating mechanisms of the power plant. The first and second housing members have first and second joining surfaces, respectively. Fastening bolts are disposed to join the first and second housing members so that the first and second joining surfaces are in tight contact with each other. Additionally, a concavities are formed on at least one of the first and second joining surfaces of the first and second housing members. A concavity is located near the location of each fastening bolt so that the bolt passes through the concavity.

By virtue of the concavity formed at the housing member joining surface, when the bolt is fastened, the fastening force of the bolt is first applied to the joining surface at points along the joining surface far from the bolt. Then, a further fastening of the bolt causes the joining surface to deform and the concavity to fully flatten or substantially flatten so that the bolt fastening force is gradually applied to the joining surface near the bolt. Consequently, when a bolt fastening operation has been completed, the bolt fastening force is uniformly applied over the whole joining surface, thereby largely increasing the rigidity of the joined housing members of the power plant. This achieves a great increase in joining rigidity, thereby largely reducing vehicle compartment noise during acceleration, particularly booming noise.

In addition, the above advantageous effect can be achieved only by forming the concavity and deforming the same at the joining surface of the joined housing members. Therefore, it is unnecessary to increase the thickness of the housing members, thereby preventing the power plant from being increased in weight.

BRIEF DESCRIPTION OF THE DRAWINGS

FIG. 4 is an enlarged side view similar to FIG. 1 but showing a third embodiment of the vehicular power plant joining structure in accordance with the present invention;

FIG. 5 is an enlarged side view similar to FIG. 1 but showing a fourth embodiment of the vehicular power plant joining structure in accordance with the present invention;

FIG. 6A is a schematic plan view of a conventional power plant joining structure; and FIG. 6B is a schematic side view of the power plant joining structure of FIG. 6A.

DETAILED DESCRIPTION OF THE INVENTION

Figure 1:
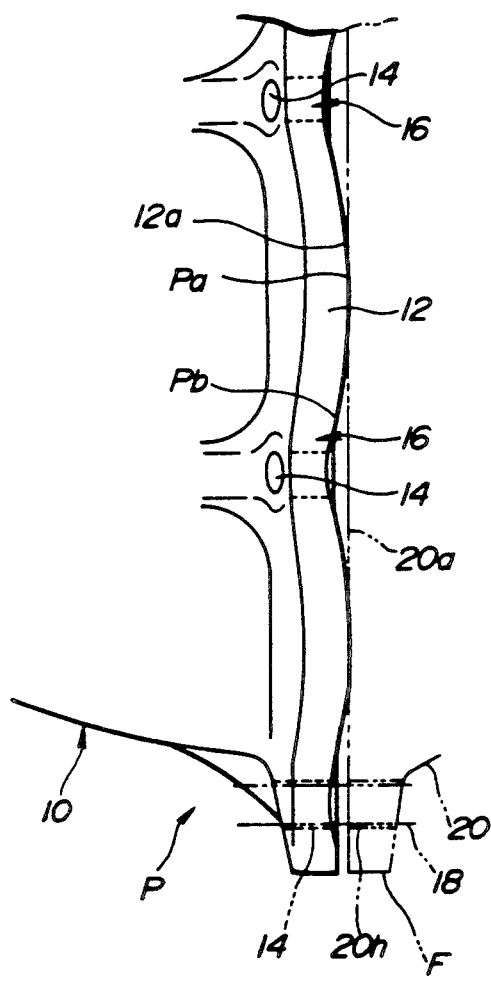
FIG. 1 is an enlarged side view of an essential part of a first embodiment of a joining structure of a power plant in accordance with the present invention.

Referring now to FIG. 1, there is shown a first embodiment of a joining structure of a vehicular power plant P in accordance with the present invention. The vehicular power plant P of this embodiment is for an automotive vehicle and comprises a transmission housing (housing member) 10 in which a transmission mechanism is disposed. The transmission housing 10 is joined with a torque converter casing (housing member) 20 and is integrally formed at its one end section (the right side end in FIG. 1) with a generally annular flange 12 having a joining surface 12a with which the joining surface 20a of the torque converter casing 20 is tightly contacted. More specifically, the joining surface 20a is formed in a generally annular flange F integrally formed at one end section (the left side end in FIG. 1) of the torque converter casing 20.

Figure 1A:
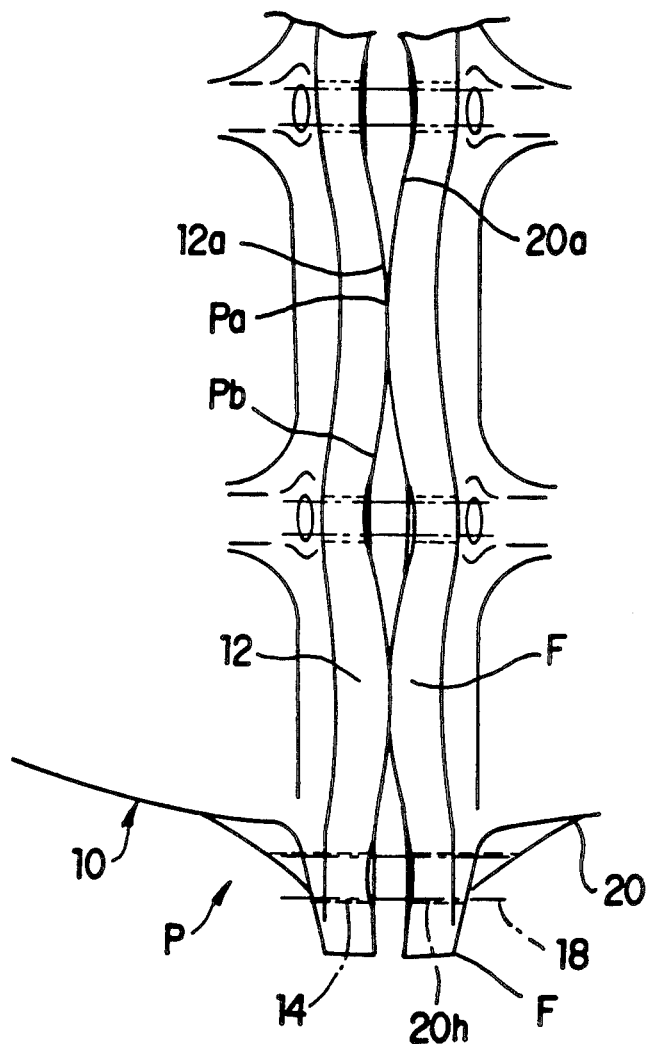
FIG. 1A is a side view of the second embodiment showing the joining structure having concavities on both joining surfaces, prior to the concavities being deforming.
Figure 1B:
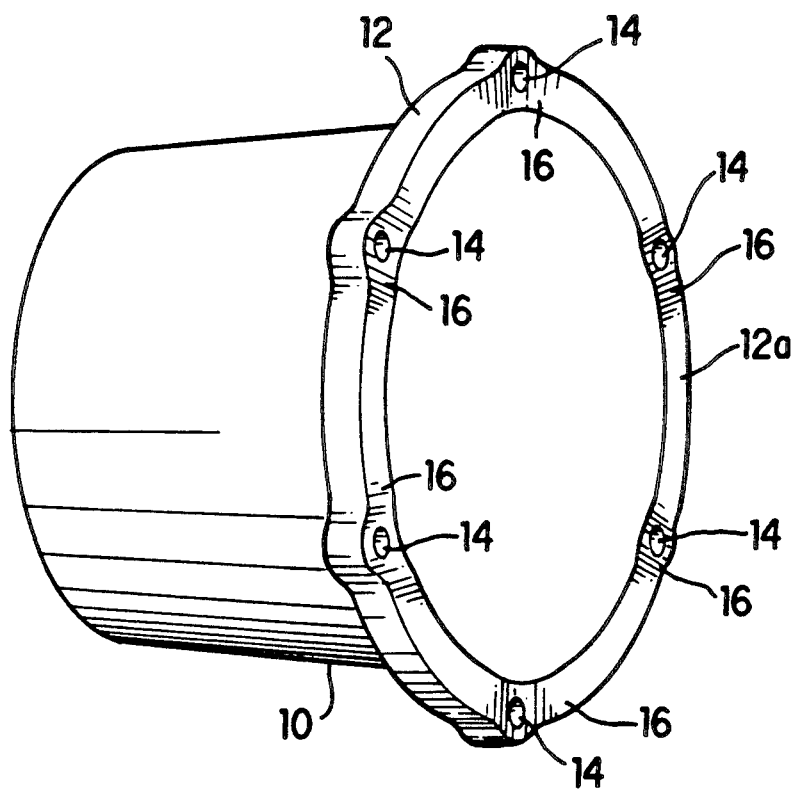
FIG. 1B is a perspective view showing one side of the joining structure.

As is clearly shown in FIG. 1B, the flange 12 is formed with a plurality of bolt holes 14 which are located at generally equal intervals along the periphery of the transmission housing 10. A fastening bolt 18 is disposed in each bolt hole 14 of the transmission housing flange 12 and in the corresponding bolt hole 20h of the torque converter casing 20. In other words, each bolt 18 passes through the corresponding bolt holes 18, 20h of the transmission housing flange 12 and the torque converter casing 20. It will be understood that the transmission housing 10 is fixedly joined with the torque converter casing 20 by the fastening the bolts 18.

As clearly shown in FIG. 1, the joining surface 12a of the transmission housing flange 12 is depressed at its locations near the bolt holes 14 to form concavities 16. More specifically, each concavity 16 is located such that the bolt hole 14 merges in the concavity 16. The concavity becomes shallower in the direction far from the bolt hole 14 in such a manner that the ends of the surface of the concavity 16 becomes flush with the joining surface 12a of the transmission housing flange 12. In this case, although the transmission housing flange 12 is formed with the concavities 16, the flange 12 has a generally uniform thickness along the whole periphery thereof as same as in conventional transmission housing flanges. In this embodiment, the joining surface 20a of the torque converter casing 20 is formed flat as same as in the conventional torque converter casings. In a second embodiment of the present invention, both joining surfaces 12a and 20a, are formed with concavities, as is shown in FIG. 1A.

With the thus arranged vehicular power plant P, when the transmission housing 10 is joined with the torque converter casing 20 in an assembly step of the power plant P, each fastening bolt 18 is inserted to extend through the bolt holes 14 and 20h of the transmission housing flange 12 and the torque converter casing 20 and fastened so that the joining surface 12a of the transmission housing flange 12 is brought into contact with the joining surface 20a of the torque converter casing 20. During fastening of the bolt 18, under the effect of the depressions 16 formed around the bolt holes 14, fastening force of the bolts 18 is first applied to the projected part Pa of the contacting surface 12a of the transmission housing flange 12 and then applied to the concave part Pb of the contacting surface 12a under deformation of the flange 12 upon a further fastening of the bolt 18. Upon fully tightening the bolts after the transmission housing 10 is joined with the torque converter casing 20, the concavities deform and fully flatten, as shown in FIG. 1C, so that the bolt fastening force is effectively uniformly and distributed over the whole flange 12.

Figure 2A:
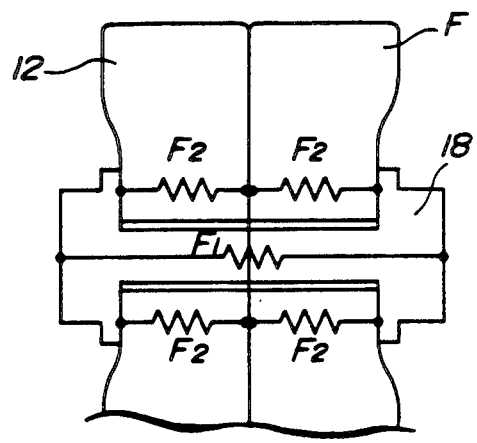
FIG. 2A is an explanatory schematic illustration showing a local rigidity at the joining surfaces of joined two housing members of the power plant of FIG. 1.
Figure 2B:
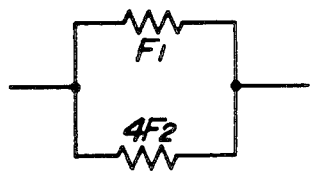
FIG. 2B is a diagrammatic illustration representative of the dynamic principle of the illustration of FIG. 2A.

FIG. 2A shows a local rigidity of the vehicular power plant of FIG. 1, in which $F_1$ denotes the rigidity of the fastening bolt 18 while $F_2$ denotes the rigidity of the flanges 12 and F of the transmission housing 10 and the torque converter casing 20, respectively. The dynamic representation of FIG. 2A is equivalent to a parallel spring representation shown in FIG. 2B.

Figure 3:
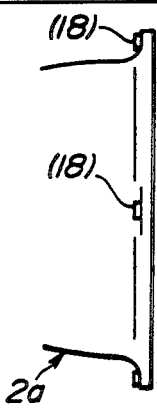
FIG. 3 is an explanatory schematic illustration showing the advantageous effects of the vehicular power plant joining structure of FIG. 1 in comparison with a conventional vehicular power plant joining structure.

FIG. 3 shows the distribution of rigidity in the power plant joining structure of the present invention in comparison with the conventional power plant joining structure shown in FIGS. 6A and 6B. In FIG. 3, the rigidity distribution in the power plant joining structure of the present invention is shown at a lower row, while that of the conventional power plant joining structure is shown at an upper row. According to FIG. 3, for the conventional power plant joining structure, high pressure distributions are found only at locations near bolts 18, so that the rigidity distribution is only to these bolt fastening locations. In contrast, in case of the power plant joining structure of the present invention, a generally uniform pressure distribution is found throughout the whole flange 12, so that the rigidity distribution is equalize throughout the whole flange 12.

Figure 1C:
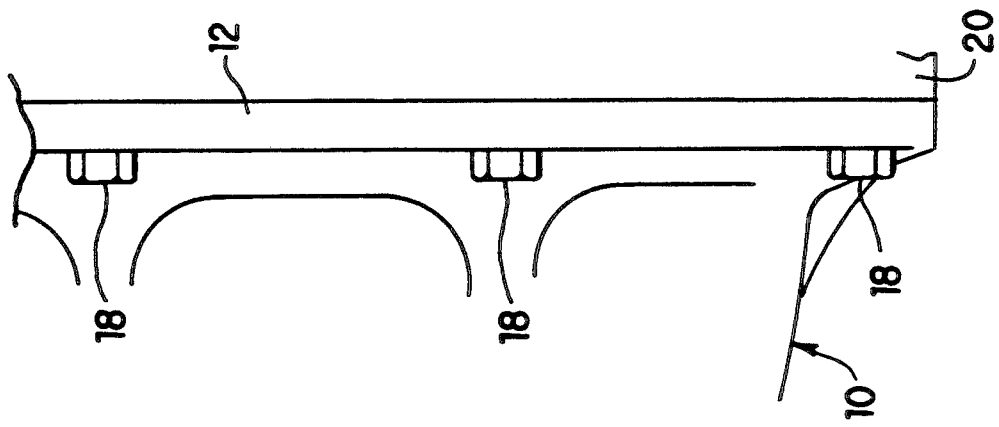
FIG. 1C is a side view of the first and second embodiments showing the state in which the concavities are fully flattened.

Thus, according to the embodiments of FIGS. 1 and 1C stress is prevented from concentrating only to the bolt fastening locations (near the bolts), and therefore is generally uniformly distributed over the whole flange 12. Accordingly, the whole local rigidity of the flange 12 can serve as the fastening rigidity of the joining structure of the vehicular power plant, thereby obtaining a greater fastening rigidity of the vehicular power plant.

The thus increased power plant fastening rigidity increases the rigidity of the transmission housing 10, thereby raising a resonance point of flexural and torsional vibrations of the power plant P within a frequency range of 200 to 600 Hz which vibrations particularly contribute to noise within a passenger compartment and generated under the power plant fastening rigidity serving as a main spring. This minimizes the amplitude variation at the resonance point, so that it is assumed that displacement input to engine mounts (not shown) are sharply lowered. Accordingly, it can be accomplished to largely reduce the passenger compartment noise and booming noise within the above-mentioned frequency range, thereby noticeably improving vehicle silence characteristics of the passenger compartment.

Figure 4A:
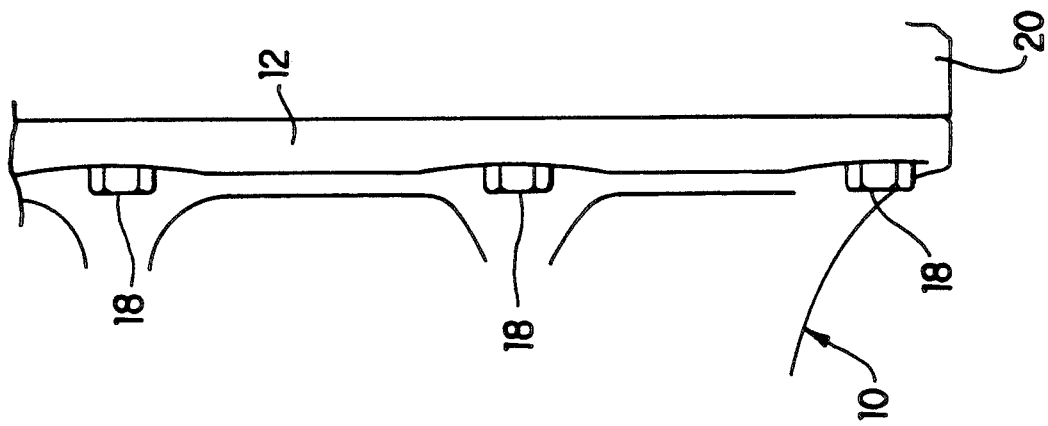
FIG. 4A is a side view of the third embodiment showing the state in which the concavities are fully flattened.

FIG. 4 illustrates a third embodiment of the power plant joining structure according to the present invention. This embodiment is substantially identical to the first embodiment, except in this embodiment, the concavity 16 is formed by cutting out or chamfering the flat joining surface 12a of the transmission housing flange 12 at the locations around the bolt holes 14. The concavity 16 in this embodiment is formed arcuate in cross-section. Each bolt hole 14 merges in the concavity 16. Similar to the first and the second embodiments, as previously described, the concavities deform and fully flatten, as shown in FIG. 4A, so that the bolt fastening force is effectively and uniformly distributed over the whole flange 12.

FIG. 5 illustrates a fourth embodiment of the power plant joining structure of the present invention, which is similar to the third embodiment except for the shape of the concavities 16. In this embodiment, each depression 16 is formed into a generally shallow and flat channel shape so that the projected and concave parts Pa, Pb of the flange joining surface 12a are formed step-like. The projected part Pa may be formed by fixedly attaching plates having a predetermined thickness, at locations not in the vicinity of the bolt holes 14 or by removing a predetermined thickness adjacent the bolt hole areas.

Figure 5A:
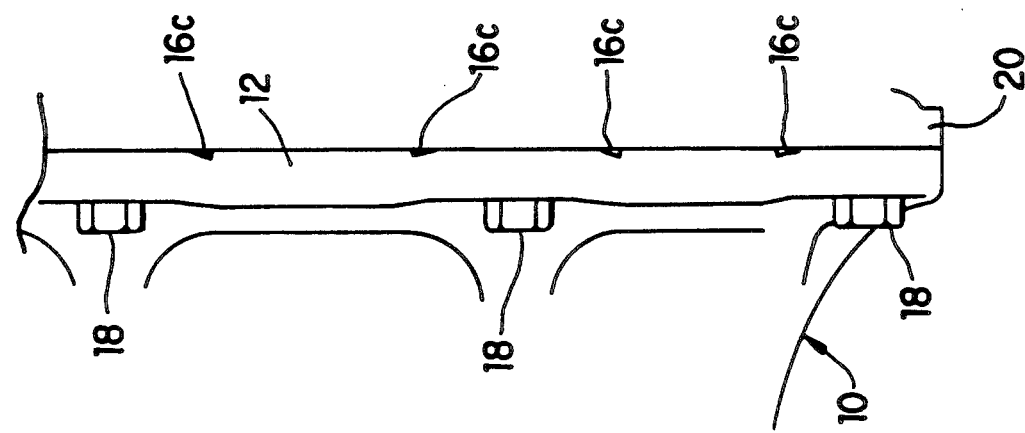
FIG. 5A is a side view of the fourth embodiment showing the state in which the concavities are substantially fully flattened.

The embodiments of FIGS. 4 and 5 can display the generally same advantageous effects as in the first and the second embodiments of FIGS. 1 and 1A respectively, accompanied by the effect of greatly facilitating machining operation of the power plant joining structure because machining operation is required only near the bolt holes 14 of the flange 12. The embodiment of FIG. 5, however, is slightly different from the first, the second, and the third embodiments in that concavities do not completely flatten upon fully tightening the bolts, as shown in FIG. 5A. Note that the concavities 16 substantially flatten, but the corner portions 16c do not flatten.

While the principle of the present invention has been shown and described as being applied only to the transmission housing, it will be understood that the principle may be applied to the torque converter casing on the opposite side of the transmission housing, or both to the transmission housing and the torque converter casing in which the depressions 16 are formed both on the joining surfaces of the transmission housing and the torque converter casing. Similarly, the depressions 16 may be formed on the joining surface of the torque converter casing and/or the joining surface of a cylinder block similarly as shown in FIG. 1A.

What is claimed is:

1. A joining structure for a vehicular power plant having first and second housing members, said first and second housing members having first and second joining surfaces respectively formed along the periphery thereof, a fastening means for joining said first and second joining surfaces, said joining structure comprising:
concavities formed at predetermined intervals on at least one of said first and second joining surfaces; and
contact surfaces formed between adjacent concavities of said at least one joining surface,
whereby said contact surfaces of said at least one joining surface initially contact said other joining surface and upon application of said fastening means, said concavities deform and fully flatten, and said contact surfaces along with said concavities fully contact said other joining surface to uniformly distribute securing forces to said first and second joining surfaces.

2. A joining structure according to claim 1, wherein each of said concavities are defined on at least one of said first and second joining surfaces by a depression, and wherein said contact surfaces protrude relative to the depressions.

3. A joining structure according to claim 1 wherein said fastening means comprises bolts and nuts, and bolt holes formed at said concavities of said at least one joining surface and the other joining surface, said bolt holes formed in said at least one joining surface being aligned with said bolt holes formed in said other surface to permit said bolts to pass therethrough.

4. A joining structure according to claim 3, wherein each of said bolt holes formed in said concavities is disposed concentrically through a center a respective concavity.

5. A joining structure according to claim 3, wherein both said first and second joining surfaces have concavities, said bolt holes being formed concentrically through a center of each of said concavities formed in said first and second joining surfaces.

6. A joining structure according to claim 5, wherein each of said first and second housing members includes a flange in which said concavity and said bolt hole are formed.

7. A joining structure according to claim 1, wherein said first housing member is a transmission housing, and said second housing member is a torque converter casing.

8. A connecting device for first and second housing members which accommodate mechanisms of a vehicular power plant, comprising:
first and second flanges, formed respectively on said first and second housing members, each of said flanges extending generally along the periphery of the respective housing member;
first and second joining surfaces, respectively formed on said first and second flanges;
a plurality of bolt holes formed at predetermined intervals along each of said first flange and said second flanges;
a plurality of bolts for joining said first and second flanges tightly connect said first and second joining surfaces, each bolt being fitted in said bolt holes formed in said first and second flanges; and
a plurality of concavities formed on at least one of the first and second joining surfaces of said first and second flanges, each concavity being located so that said bolt hole is disposed concentrically through a center of each of said concavities; and
contact surfaces formed between adjacent concavities of said at least one joining surface,
whereby said contact surfaces of said at least one joining surface initially contact said other joining surface and upon application of said fastening means, said concavities deform and fully flatten so that said contact surfaces along with said concavities fully contact said other joining surface to uniformly distribute securing forces to said first and second flanges.

9. A connecting device for first and second housing members which accommodate mechanisms of a vehicular power plant, comprising:
first and second flanges, formed respectively on said first and second housing members, each of said flanges extending generally along the periphery of the respective housing member;
first and second joining surfaces, respectively formed on said first and second flanges;
a plurality of bolt holes formed at predetermined intervals along each of said first flange and said second flanges;

a plurality of bolts for joining said first and second flanges tightly connect said first and second joining surfaces, each bolt being fitted in said bolt holes formed in said first and second flanges; and a plurality of concavities formed on at least one of the first and second joining surfaces of said first and second flanges, each concavity being located so that said bolt hole is disposed concentrically through a center of each of said concavities; and contact surfaces formed between adjacent concavities of said at least one joining surface, whereby said contact surfaces of said at least one joining surface initially contact said other joining surface and upon application of said fastening means, said concavities deform and substantially flatten so that said contact surfaces along with said concavities substantially contact said other joining surface to uniformly distribute securing forces to said first and second flanges.

10. A connecting device according to claim 9, wherein each of said concavities are defined by a shallow depression, and wherein said contact surfaces protrude relative to the depressions.

11. A connecting device according to claim 10, wherein said depression is generally flat with edges and upon application of said fastening means, said depression substantially flatten, except generally in an area of said edges.

* * * * *